(12) United States Patent
Lesser et al.

(10) Patent No.: US 7,782,993 B2
(45) Date of Patent: Aug. 24, 2010

(54) APPARATUS FOR SUPPLYING AN ENCODED DATA SIGNAL AND METHOD FOR ENCODING A DATA SIGNAL

(75) Inventors: Richard Lesser, Karlsruhe (DE); Alexander Post, Eisingen (DE); Ivan Dimkovic, Karlsruhe (DE); Thomas Albrecht, Pforzheim (DE)

(73) Assignee: Nero AG, Karlsbad (DE)

( * ) Notice: Subject to any disclaimer, the term of this patent is extended or adjusted under 35 U.S.C. 154(b) by 639 days.

(21) Appl. No.: 11/619,974

(22) Filed: Jan. 4, 2007

(65) Prior Publication Data

US 2008/0165895 A1    Jul. 10, 2008

(51) Int. Cl.
*H04L 25/00* (2006.01)
(52) U.S. Cl. ...................................................... 375/371
(58) Field of Classification Search .................. 375/259, 375/316; 340/10.1; 382/239, 233
See application file for complete search history.

(56) References Cited

U.S. PATENT DOCUMENTS

| 6,065,120 | A  | 5/2000 | Laursen et al. |
| 6,199,114 | B1 | 3/2001 | White et al. |
| 2004/0177167 | A1 | 9/2004 | Iwamura et al. |
| 2006/0212784 | A1* | 9/2006 | Griniasty et al. ............. 714/791 |
| 2007/0081732 | A1* | 4/2007 | Makiyama et al. ........... 382/239 |
| 2009/0122865 | A1* | 5/2009 | Henocq et al. .......... 375/240.12 |

FOREIGN PATENT DOCUMENTS

| EP | 1263233 A2 | 12/2002 |
| EP | 1492265 A1 | 12/2004 |
| EP | 1640877 A1 | 3/2006 |
| WO | WO0153988 A2 | 7/2001 |
| WO | WO2006033068 A1 | 3/2006 |

\* cited by examiner

*Primary Examiner*—Khai Tran
(74) *Attorney, Agent, or Firm*—Michael A. Glenn; Glenn Patent Group

(57) ABSTRACT

An apparatus for supplying an encoded data signal comprises a detector for detecting information on an internal receiver for receiving the encoded data signal, a selector for selecting a coding scheme to be used for encoding the data signal the selector being operative to access a data base having entries for different internal receivers, an entry having one or more properties of a coding scheme customized for the receiver associated with the entry and an encoder for encoding the data signal using a coding scheme having the selective property or a destination information provider for providing destination information so that the encoded data signal is stored at the right storage location in an intended receiver.

25 Claims, 3 Drawing Sheets

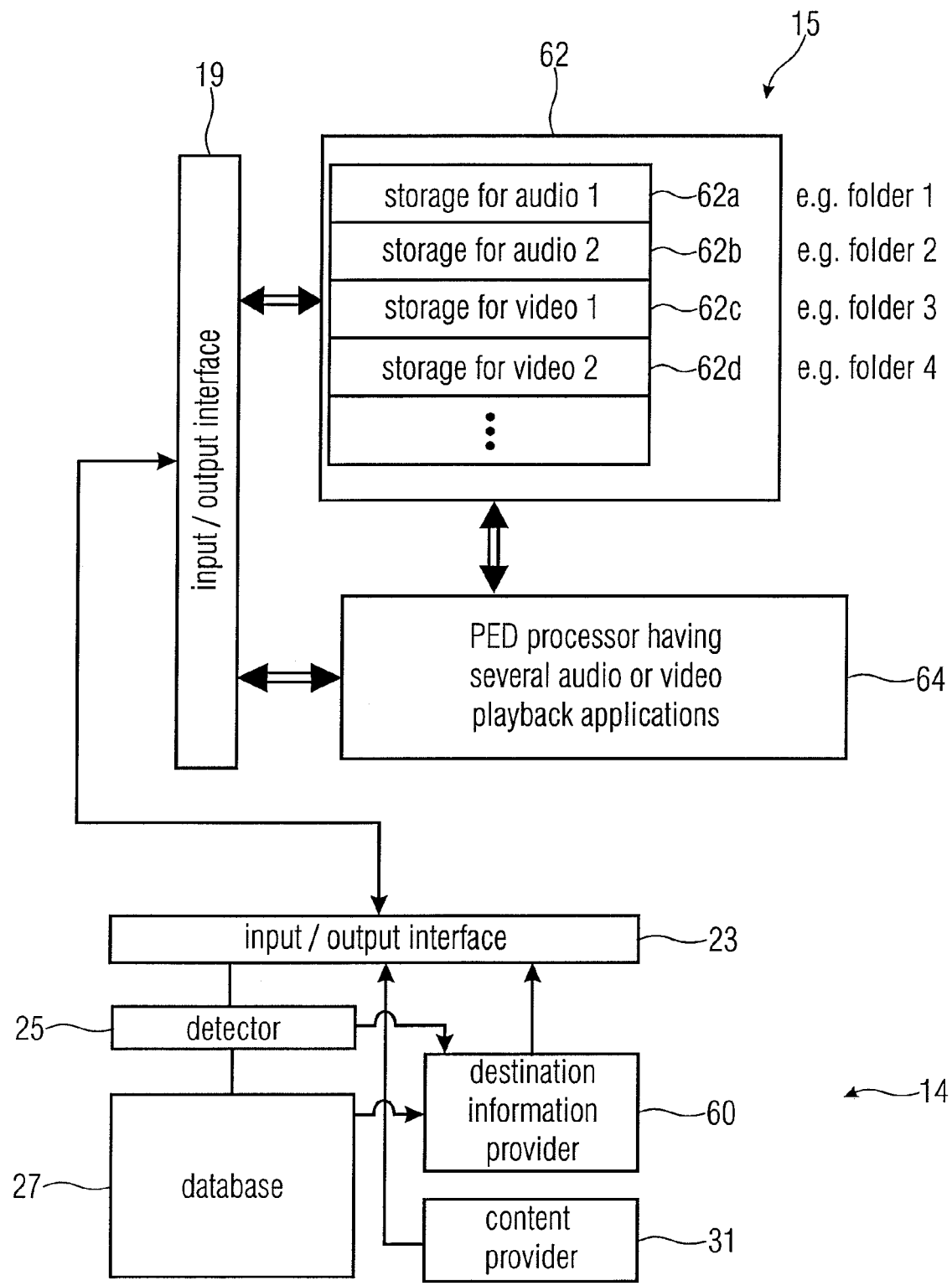

APPARATUS FOR SUPPLYING AN ENCODED DATA SIGNAL AND METHOD FOR ENCODING A DATA SIGNAL

FIELD OF THE INVENTION

The present invention is related to an apparatus for supplying an encoded data signal and a method for encoding a data signal.

BACKGROUND OF THE INVENTION

A variety of personal electronic devices that are capable of delivering rich multimedia experiences such as listening to digital music, watching digital photos has been introduced. Many conventional devices such as MP3-players (MP3=Motion Picture Estimate Group Audio Layer 3), mobile telephones, ipods, portable multimedia players (PMPs) are now capable of displaying digital multimedia, such that users typically have a majority of their multimedia content in their homes, stored on their personal computer (PC) storage systems such as Hard Disc Drives, in order to deliver or copy the content of the home PC acting like a media center to the mobile device. Hence a PC is usually equipped with software which performs a copy operation from the PC to the mobile device via any kind of data transfer protocol, like USB (USB=Universal Serial Bus), Blue tooth, Serial Port, IrDA (IrDA=Infrared Data Association) etc.

However, apparatuses running state of the art software packages are not able to recognize the properties of the personal electronic device, which is used for displaying the content. Hence, a user is requested to make sure that the content can be displayed properly on the target device e.g. a user must make sure that the video content size, like the resolution, must fit the capabilities of the mobile device of the mobile device to display the content of the video data. In case the user fails to do so, it might either result in an improper playback of the content, or an insufficient projection of the content on the target device, no playback at all or even a hardware malfunction of the target mobile device. As the variety of electronic device types is increasing, wherein each device type or device model can have completely different properties like decoding performance, CPU or DSP speed (CPU=central processing unit; DSP=digital signal processor), screen size, number of audio channels, display refresh rate while the time between purchases of these new devices by end users is decreasing, it is becoming increasingly complicated for users to ensure optimum playback quality of multimedia content on their personal electronic devices.

SUMMARY OF THE INVENTION

The present invention provides an apparatus for supplying an encoded data signal, comprising: a detector for detecting information on an intended receiver for receiving the encoded data signal; a selector for selecting a coding scheme to be used for encoding the data signal based on detected information on the intended receiver; and an encoder for encoding the data signal using a selected coding scheme.

The present invention furthermore provides a method for supplying an encoded data signal, comprising detecting information on an intended receiver for receiving the encoded data signal; selecting a coding scheme to be used for encoding the data signal based on the information on the intended receiver; and encoding the data signal by using the selected coding scheme.

The present invention furthermore provides an apparatus for supplying an encoded data signal, comprising: a detector for detecting information on an intended receiver for receiving the encoded data signal; an output interface for outputting the encoded data signal; and a destination information provider for providing, in response to the information on the intended receiver, destination information on a virtual or physical storage location of the intended receiver to the output interface so that the encoded data signal, when received at the intended receiver is stored at the virtual or physical storage location identified by the information on the intended receiver.

The present invention furthermore provides a method of supplying an encoded data signal, comprising: detecting information on an intended receiver for receiving the encoded data signal; and providing, in response to the information on the intended receiver, destination information on a virtual or physical storage location of the intended receiver to the intended receiver so that the encoded data signal, when received at the intended receiver is stored at the virtual or physical storage location identified by the information on the intended receiver.

The present invention furthermore provides related computer programs and corresponding systems having a receiver and a transmitter.

BRIEF DESCRIPTION OF THE DRAWINGS

Preferred embodiments of the present invention are subsequently explained with respect to the accompanying drawings, in which:

FIG. 4 shows a further embodiment of the invention, in which the intended receiver has several storage possibilities for several applications.

DETAILED DESCRIPTION OF PREFERRED EMBODIMENTS

Figure 1:
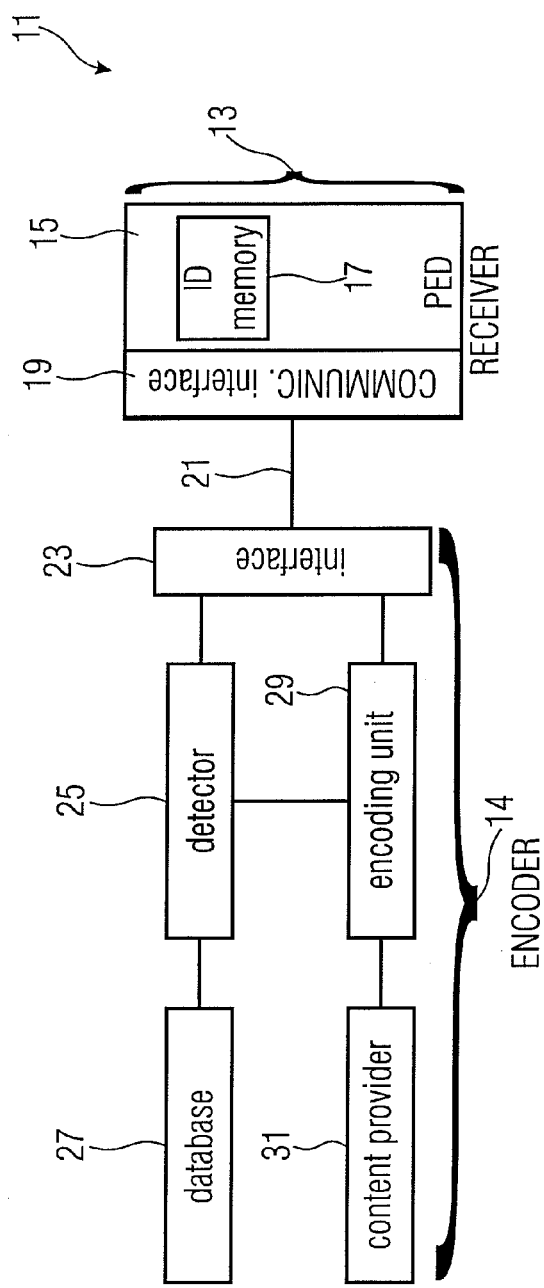
FIG. 1 shows a system for transmitting and receiving an encoded data signal in accordance with a preferred embodiment of the invention.

The present invention is based on the finding that an apparatus for supplying an encoded data signal comprising a detector for detecting information on an intended receiver, a selector for selecting a property of a coding scheme to be used for encoding the data signal out of a preferably existing data base having entries for different intended receivers and an encoder for encoding the data signal using a coding scheme having the selected property enables a more efficient encoding of a data signal, as the apparatus can adapt the way of encoding the data signal to a property of a receiver for receiving the encoded data signal. Alternatively, the information can be directly transmitted from the intended receiver without having a full data base at the transmitter.

Hence, e.g. the apparatus for supplying an encoded data signal can adapt the bit rate of the data signal according to the playback capability of the receiver such that the receiver does not receive any obsolete data, which the receiver is not able to play or display, or the apparatus for supplying an encoded data signal can adapt the way of encoding to a dedicated quality requested by the receiver or a user operating the receiver. In an embodiment of the present invention, an apparatus for supplying an encoded data signal can receive an information on an intended receiver for receiving the encoded data signal. This information can be a resolution of a display of a receiver.

The apparatus for supplying an encoded data signal according to the present invention can select in response to receiving this information a coding scheme to be used for encoding the data signal by accessing the data base having entries for different intended receivers, wherein an entry has one or more properties of a coding scheme that is customized to the receiver associated with the entry. By using a coding scheme with the selected property, the apparatus for supplying the encoded data signal can adapt the way of encoding the data signal to a property depending on a type of an intended receiver and hence, adapt the format of the encoded data signal to the intended receiver and the capabilities of the intended receiver in a precise way. This enables the apparatus for supplying an encoded data signal according to the present invention for example to adapt the way of encoding the signal to the resolution of the receiver and hence, make sure that the encoded data signal does not comprise any data or any information related to a content or pixels that cannot be displayed by the receiver.

In an embodiment of the present invention, the apparatus for supplying an encoded data signal comprises a means for detecting the presence of the device, and for detecting the connection of the device to a PC system. The apparatus according to the present invention, further comprises a means for identifying the device type, with regard to the model, by analyzing the IMEI-number (IMEI=International Mobile Equipment Identity)-number, the OBEX Protocol (OBEX=Object Exchange Profile), a USB-vendor-protocol or a Model ID (ID=Identification). The means for identifying the device type can then extract the device properties, like the capabilities or the personal preferences from the identification of the device. A content provided by the apparatus or the encoded data signal can be adapted such that the content or the encoded data signal is then optimized, e.g. according to the performance of the data transfer channel between the personal electronic device and the PC. The same is also valid for a method for supplying an intended data signal according to the present invention.

The above-mentioned personal preferences can comprise:

an information source on which an identification of the device type is based on wherein the information source can be a data base or any information source containing records describing device capabilities, data link capabilities and optionally personal preferences, wherein a record identifier is related to a PED (PED=Personal-Electronic-Device) being detected and connected to the PC system. Or the personal preferences can comprise an information package containing the same data as in the information source mentioned above, wherein the data or the information is directly retrieved from the PED detected and connected to the PC system over the data transfer channel between them.

As the apparatus for supplying an encoded data signal according to an embodiment of the present invention, comprises further means for adapting the content, like the multimedia content intended for a transfer to the PED a means for adapting the way of encoding the data signal by using a coding scheme with a selective property according to the information collected by the means for detecting an information or a means for selecting one or more properties of a coding scheme customized to the identity of the device type of the receiver the apparatus for supplying the encoded data signal can select one or more properties of a coding scheme based on the device properties or the personal preferences. The device properties can be a CPU-speed, a PC-from-to-mobile device transfer speed, an internal I/O-speed, in particular the maximum bit rate of an internal I/O-base, an available storage space, a display resolution, a display aspect ratio, a number of colors a device is able to display, an optimal refresh-rate or an optimal frame-rate, a number of output audio channels, an optimal audio sampling rate, an optimum audio bit depth, a list of supported digital storage formats, which the intended device is capable of decoding.

Examples for personal preferences are a preferred language, a user preference towards content quality, an allocation of the content fitted to the storage space, such that more content can be stored, a potential parental control flag like a prohibition of a storage of an explicit content, a preferred storage format, a potential disability flag indicating that the device user is disabled or the type of his disability.

The way of encoding a data signal or the way of adapting the content can be performed by the following operations:

a transcoding or a format conversion adapted to the digital audio-format or video-format supported by the device or the intended receiver, by employing means of digital audio and video decompression and compression;

changing the bit rate of the content to be delivered to the device or the receiver or adapting the coding scheme to achieve a dedicated bit rate by adapting the bit rate to the available device storage space, the maximum data rate between the device storage unit and the device central processing unit or any kind of user preferences towards either more content on the available storage space or the optimum content quality;

adapting the content video resolution to fit the mobile device screen size;

changing the content video frame rate to fit the mobile device optimal display frame rate like the refresh rate;

changing the audio sampling rate for example by means of audio re-sampling or changing the number of audio channels, e.g. by means of an up-mixing or down-mixing, to fit the mobile device audio capabilities;

selecting the proper audio track and storing it into the content to be delivered to the mobile device in order to reflect the preferred language on the mobile device, selecting the proper subtitle data file, storing it into the content to be delivered or delivering it and associating it with the content to be delivered, wherein the content is to be delivered to the mobile device, in order to reflect the preferred language on the mobile device, modifying the video contrast, the video brightness, enlarging the subtitle data, amplifying or modifying parts of the content to be delivered to the mobile device these parts containing human dialog or human speech in order to improve the picture and audio clarity for the users of the mobile device wherein the users can be any kind of disabled persons;

or removing, muting or modifying parts of the content which are not in accordance with the parental control flags set and related to the target mobile device.

An apparatus according to an embodiment of the present invention comprises a processing logic that is capable of analyzing a variety of device properties or personal preferences and identify an optimal content coding configuration for the given properties, wherein the optimal content coding configuration can be a combination of the coding parameters or optionally in case there is no optimal solution offering a user a choice among the several coding parameter sets rated in accordance to some criteria like a target quality, a target size, wherein the criteria can be predefined or specified by the user himself.

An apparatus for supplying an encoded data signal according to a further embodiment of the invention, can comprise a multimedia content provider that can reside on a personal computer, like a content data base, or a media library, or the multimedia content can be located on any kind of remote location such as a remote content server, a web service, etc. and encode a data signal from this multimedia content provider by using a coding scheme having the selective property. Hence, the multimedia content can be encoded in an efficient way, in order to supply an encoded data signal adapted to the properties of an intended receiver.

A system for transmitting and receiving an encoded data signal according to the present invention comprises a transmitter for transmitting an encoded data signal, wherein the transmitter comprises a detector for detecting information on an intended receiver for receiving the intended data signal, a selector for selecting a coding scheme to be used for encoding the data signal, the selector being operative to access the data base having entries for different intended receivers, an entry having one or more properties of a coding scheme customized to the receiver associated with the entry and an encoder for encoding the data signal using the coding scheme having the selected property and a receiver for receiving the encoded data signal and decoding the data signal.

As the system for transmitting and receiving an encoded data signal can adapt a coding scheme of the transmitter by selecting a property of a coding scheme customized to the receiver in a data base and encodes the data signal according to the coding scheme such that the encoded data signal is transmitted to a receiver for receiving the encoded data signal and decoding the encoded data signal, the system can encode and decode the data signal in an efficient way. The coding scheme for encoding the data signal is selected in relation to the intended receiver and, hence, the coding scheme used by the transmitter can be precisely adapted to the requirements of the receiver. The transmission between the transmitter and the receiver or the receiving apparatus can be like a transmission of data between a PC computer and a mobile device, e.g. via a USB connection, a Bluetooth connection or an IrDA connection.

A receiver for receiving the encoded data signal can comprise a personal electronic device transmitting an information package over a data transmission protocol, wherein the information package can contain a device type identifier, like an identifier of a model or, optionally, any kind of personal references, or the information package can contain data describing device properties or device capabilities, data link capabilities or, optionally, any kind of personal preferences.

FIG. 1 shows a block diagram of a system for transmitting and receiving an encoded data signal according to the present invention. The system 11 comprises a receiver 13 for receiving an encoded data signal and an encoder 14 for supplying an encoded data signal. The receiver 13 comprises a PED 15, a device-ID memory 17 and a communication interface 19. All three elements 15, 17 and 19 are positioned in the housing of the receiver 13 and are electrically connected to each other, such that the PED 15 can read out the device-ID out of the memory 17 and transmit it via the interface 19 over a link 21 to an interface 23 of the encoder 14. Any kind of data transmission protocol, like a Bluetooth protocol, can be used for exchanging messages via the interfaces 19, 23.

The encoder 14 detects a presence of the receiver 13 comprising the PED 15, the device-ID memory 17 and the interface 19 by receiving a message, like a Bluetooth protocol message from the receiver 13 over the link 21. This message from the receiver to the encoder is sent in order to establish a connection between the encoder 14 and the receiver 13.

Upon the establishment of the connection, the PED 15 delivers an information package via the interface 19 and the link 21 to the interface 23 of the encoder 14. The information package is encoded according to the used coding schemes or the data transmission protocol used for the communication via the interfaces 19, 23. The information package sent from the receiver 13 to the encoder 14 contains an identifier of the device type model, a personal preference or a unique identifier, for example, a part of an IMEI number of the device, frequently called serial sequence of the model.

A detector 25 in the encoder 14 connected to the interface 23 receives the message or the information package and evaluates the information package. Thus, the detector detects an information on the receiver 13 that is intended to receive the coded data signal from the encoder 14. Based on the content of the information package, the detector 25 accesses a data base 27 having entries for different intended receivers, wherein an entry has one or more properties of a coding scheme customized to the receiver associated with the entry and selects a dedicated coding scheme to be used for encoding a data signal to be transmitted to the receiver 13. The properties selected in the data base or the device properties information source can be properties like a CPU speed, a data transfer speed of a communication between a PC and a mobile device, a maximum bit rate of an internal I/O connection, like an internal I/O speed, an available storage space, a display resolution, a display aspect ratio, a number of colors, the receiver 13 or a device is able to display, an optimal refresh/frame rate, a number of output audio channels, an optimum audio sampling rate, an optimum audio bit depth or a list of supported digital storage formats and/or all known encoding or decoding profiles, the receiver 13 is capable of decoding.

An encoding unit 29 or a content adaption apparatus receives a signal from the detector 25 with an information on the coding scheme to be used for encoding a data signal.

The encoding unit 29 in the encoder 14 receives a data signal, like a multimedia content, from a content provider 31, for example, if a user wishes to copy a multimedia content from a PC to the PED 15 encodes the data signal from the content provider 31 and transmits the encoded data signal via the interface 23 of the encoder to the receiver 13. Embodiments of the content provider 31 are a PC media library, a remote content storage, such as a Web server, or, for example, a personal data carrier whose content is to be copied to the PED. Hence, the way of encoding the data signal is adapted to the information on or the identity of an intended receiver. The adaption or modifications of the coding scheme can be implemented by the following operations:

- adapting the transcoding or format conversion to a digital audio/video format supported by the receiver by employing means of digital audio and video compression and decompression;
- changing the bit rate of the content to be delivered to the receiver or the device while taking into account the available device storage space, the maximum data rate between the device storage unit and the device central processing unit or any kind of user preference towards more content or the available storage space or the optimum content quality;
- adapting the content video resolution to fit a screen-size of a mobile device;
- changing the frame rate of a video content, so that the rate fits to the display frame rate or the refresh rate of a mobile device;

changing the audio sampling rate, for example, by means of audio re-sampling or adapting the number of the used audio channels, for example, via means of up/down mixing, such that the number of audio channels fits to the audio capabilities of a mobile device;

selecting a proper audio track and storing an information on the proper audio track in a content to be delivered via the encoded data signal to the mobile device in order to reflect the preferred language on the mobile device;

selecting a proper sub-title data file and consecutively storing a sub-title data file into the contents to be delivered to the mobile device via the link 21 or instead of storing it into the content, delivering it and associating it with the content to be delivered, such that the content to be delivered reflects the preferred language of a mobile device;

modifying or adapting the coding scheme with regard to the following properties: video contrast, video brightness, the size of the sub-title data or amplifying or modifying parts containing human dialog/speech or a content to be delivered to a mobile device in order to improve a picture and audio clarity for a user of the mobile device, in particular for a disabled user of the mobile device, or removing or muting parts of the data signal or the content not being in accordance with the parental control flags set and related to the target mobile device.

The detector 25 can be equipped with a processing logic capable of analyzing a variety of device properties and personal preferences or finding an optimum multimedia content coding configuration for a given set of properties, for example, via a combination of several coding parameters or, optionally, by offering a user the choice among several coding parameter sets rated in accordance with criteria, like a target quality, a target size, wherein the criteria can be predefined or specified by the user himself.

In an alternative embodiment of the encoder 14, the content of the data base 27 and an information on the receiver 13 can be sent from the detector 25 to the encoding unit 29, such that the encoding unit 29 is able to select the coding scheme to be used for encoding the data signal by accessing the data base with the entries for different intended receivers and select one or more properties of the coding scheme customized to the receiver associated with the entry and encode the data signal by using a coding scheme with the selected property.

The encoded data signal is transmitted to the receiver or, more precisely, to the PED 15 in the receiver after adapting the multimedia content or encoding the data signal. Hence the encoding unit 29 is able to encode the data signal by using the best possible coding scheme or by selecting the best possible method of data transmission, like the fastest transfer time for the connected PED, based on the data link capabilities.

Figure 2:
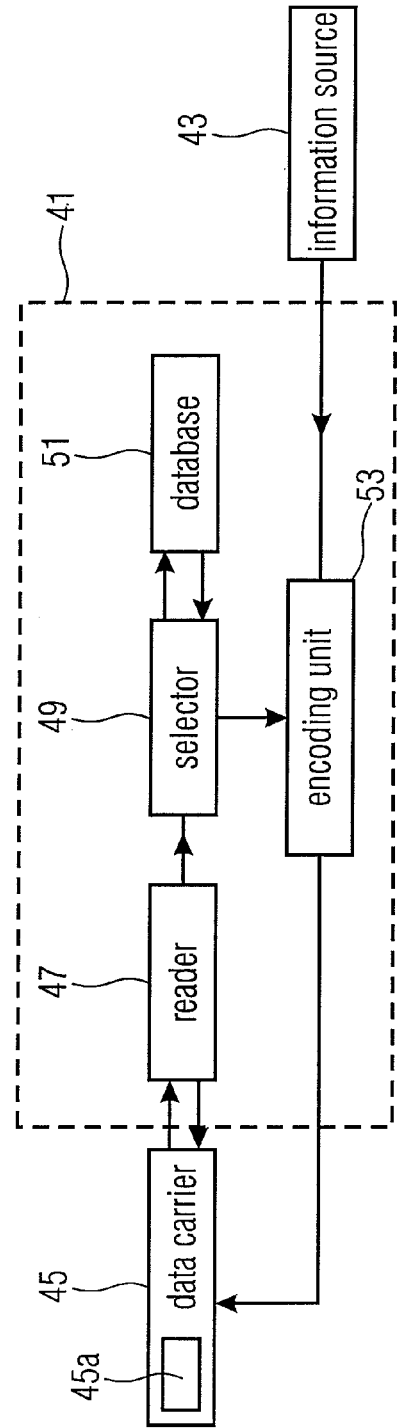
FIG. 2 shows an apparatus for supplying an encoded data signal, wherein the encoded data signal is supplied to a portable data carrier.

An encoder 41 according to a further embodiment of the present invention is shown in FIG. 2. The encoder 41 receives a data signal from an information source 43, like a file on a PC, a data carrier, a server or any kind of device supplying a data signal. A portable data carrier 45 is connected to the encoder 41 via a not explicitly shown interface. After the connection between the encoder 41 and the portable data carrier 45 has been established, a reader 47 in the encoder 41 reads out an identity of an intended receiver stored in the register terminal of the portable device 45. This information was written in a register 45a after the portable data carrier 45 had been inserted in the intended receiver at an earlier time, wherein the information contains an identification constituting the information of the intended receiver. In other words, the register 45a stores an identification information on the intended receiver written to the register during a period in which the portable data carrier 45 was inserted in a receiver.

The reader 47 retrieves this identification information written on the portable data carrier 45 and transfers this information to a selector 49. Upon receiving the information on the identity of the intended receiver from the reader 47, the selector 49 accesses a data base 51 having entries for different indented receivers, wherein an entry has one or more properties of a coding scheme customized to the receiver intended to decode the data written on the portable data carrier 45. After accessing the data base 51, the selector 49 reads out a dedicated coding scheme with a selected property and transfers an information on the dedicated coding scheme to an encoding unit 53 positioned in the encoder 41. As already explained above the encoding unit 53 receives the data signal from the information source 43 and encodes the data signal by using the dedicated coding scheme having the selected property and transmits a data signal encoded according to the dedicated coding scheme to the portable data carrier 45. Thus, the encoding unit 53 or the encoder 41 writes a data package encoded according to the dedicated coding scheme into the portable data carrier 45.

In the following, a method for encoding a data signal according to an embodiment of the present invention to be carried out by an encoding apparatus is explained in FIG. 3. In a step S11, an information on an intended receiver for receiving an encoded data signal is detected. This information can, for example, be an identity of a receiver, a serial number, a property of the receiver, like a resolution of a display, or a preference of a user of the receiver.

Upon detecting an information on the intended receiver, a coding scheme to be used for encoding the data signal is selected by accessing a data base having entries for different intended receivers, wherein each entry has one or more properties of a coding scheme customized to the intended receiver associated with the entry in a step S13. Hence, a customized coding scheme or a coding scheme dedicated to the intended receiver has been selected. In a further step S15, a received data signal is encoded by using the dedicated coding scheme with the selected property. This encoded data signal can, for example, be transmitted to an external receiver or to a portable data carrier to be inserted in an intended receiver. The method explained above and shown in FIG. 3 can be implemented in a program code for performing the method when the computer program runs on a computer.

In the portable data carrier 45, a register 45a is used for storing an entry of an identification information of the receiver device to which the portable data is to be attached. However, any kind of a predetermined area of the portable data carrier to be accessed by the reader 47 in order to retrieve an identification information on an intended receiver can be an alternative.

The portable data carrier 45 preferably comprises a memory card, a USB stick, a CD, a DVD or a magnetic device to store data. However, any portable means for storing data are alternative embodiments.

The encoder 41 preferably establishes a communication with the data carrier 45 via an interface, like a USB interface, a memory card interface or a PCI-bus interface. However, any kind of interfaces for establishing a communication between the encoder 41 and the data carrier 45 are alternatives.

The data bases 27, 51 are preferably stored in the encoders 14, 41. However, any kinds of media even e.g. physically separated from the encoders are alternatives for storing the data bases 27, 51. In addition to this, the encoders 14, 41 can have a network interface, for example, connected to a remote server such that the entries in the data bases 27, 51 can be updated. Information on an entry for an intended receiver or one or more properties customized to the receiver associated with the entry or any kind of information on a new receiver can be received via the network interface.

In an alternative embodiment of the encoders 14, 41, an information on a device property or a receiver property or a personal preference, for example, of a user of the receiver can be stored directly in the encoding units 29, 53 such that the detector 25 or the selector 49 provides an information on the intended receiver and the encoding unit 29, 43 selects control parameters for encoding, transcoding or adapting the multimedia content provided by the elements 31, 43 as control parameters.

The receiver 13 preferably sends a message related to an identification of the receiver 13 to the encoder 14 via the link 21. However, in an alternative embodiment of this invention, a receiver could send an information related to properties of the receiver to the encoder 14. This information could reside on the personal electronic device 15. In the embodiment of the system according to the present invention shown in FIG. 1 even personal preferences along with the information receiver properties could be transmitted from the PED to the detector 2S via the interface 23

In a further alternative embodiment, personal preferences to be stored along with the receiver properties in the PED, for example a unique identifier, like a unique serial number of a device, could be stored in the PED and this information could be sent via a message to the encoder 14 that can select a dedicated coding scheme with one or more properties out of a data base upon receiving this information. This unique identifier or this unique information could be a device type/ model identifier, like a full IMEI number, containing a device serial number.

FIG. 4 illustrates another preferred embodiment of the present invention, in which the intended receiver 15 includes a storage area 62 and a PED (Personal-Electronic-Device) processor 64 having several audio or video playback applications. These audio or video playback applications can be different with respect to type, i.e., that the one playback application is for playing back video and another playback application is for playing back audio. Alternatively or additionally, these playback applications can be different in their characteristics while having the same type. Thus, a first playback application can be for playing back MP3 audio files while another audio playback application can be for playing back MP4 audio files while a further audio playback application can be for playing back AC3 files or WAV files.

Furthermore, the storage 62 of the intended receiver is organized such that there are several storage locations 61a, 62b, 62c and 62d, which are reserved for different playback applications. In the FIG. 4 embodiment, the storage location 62a is reserved for audio playback application 1, and the storage location 62b is reserved for audio playback application 2. Furthermore, the storage location 62c is reserved for video playback application 1, and the storage location 62d is reserved for video playback application 2. The PED processor 64 is implemented such that a certain playback application accesses a certain pre-defined storage location when playing back the file. The storage locations can be physical and/or virtual storage locations identified by addresses in physical or virtual forms. Furthermore, the storage locations can also be different folders as can be created and managed by a file manager such as the well-known windows explorer.

In the preferred embodiment of FIG. 4, the destination information provider 60 is present, which provides information on the selected storage location of the intended receiver based on the information provided by the detector 25. Thus, when it has been detected by the detector that a certain encoded data file is for audio playback application 1, the destination information provider 60 provides information to the input/output interface 23 which makes sure that, when the encoded data signal arrives at the input/output interface 19 of the intended receiver the encoded data signal is stored at the storage location 62a. The destination information provider 60 is specifically formed for providing, in response to the information on the intended receiver, destination information on a virtual or physical storage location of the intended receiver to the output interface 23 so that the encoded data signal, when received at the intended receiver is stored at the virtual or physical storage location identified by the information on the intended receiver.

When, alternatively, the detector 25 detects that a certain en coded data file has to be played back by audio application 2, then the destination information provider 60 provides information to the input/output interface 23, which makes sure that the encoded data signal is stored at storage location 62b intended for audio playback application 2 rather than any other storage location. Thus, it is ma de sure that the personal electronic device, when using a certain audio or video playback application only has to access a certain storage location such as a certain folder and always receives a file which has the correct properties.

Figure 3:
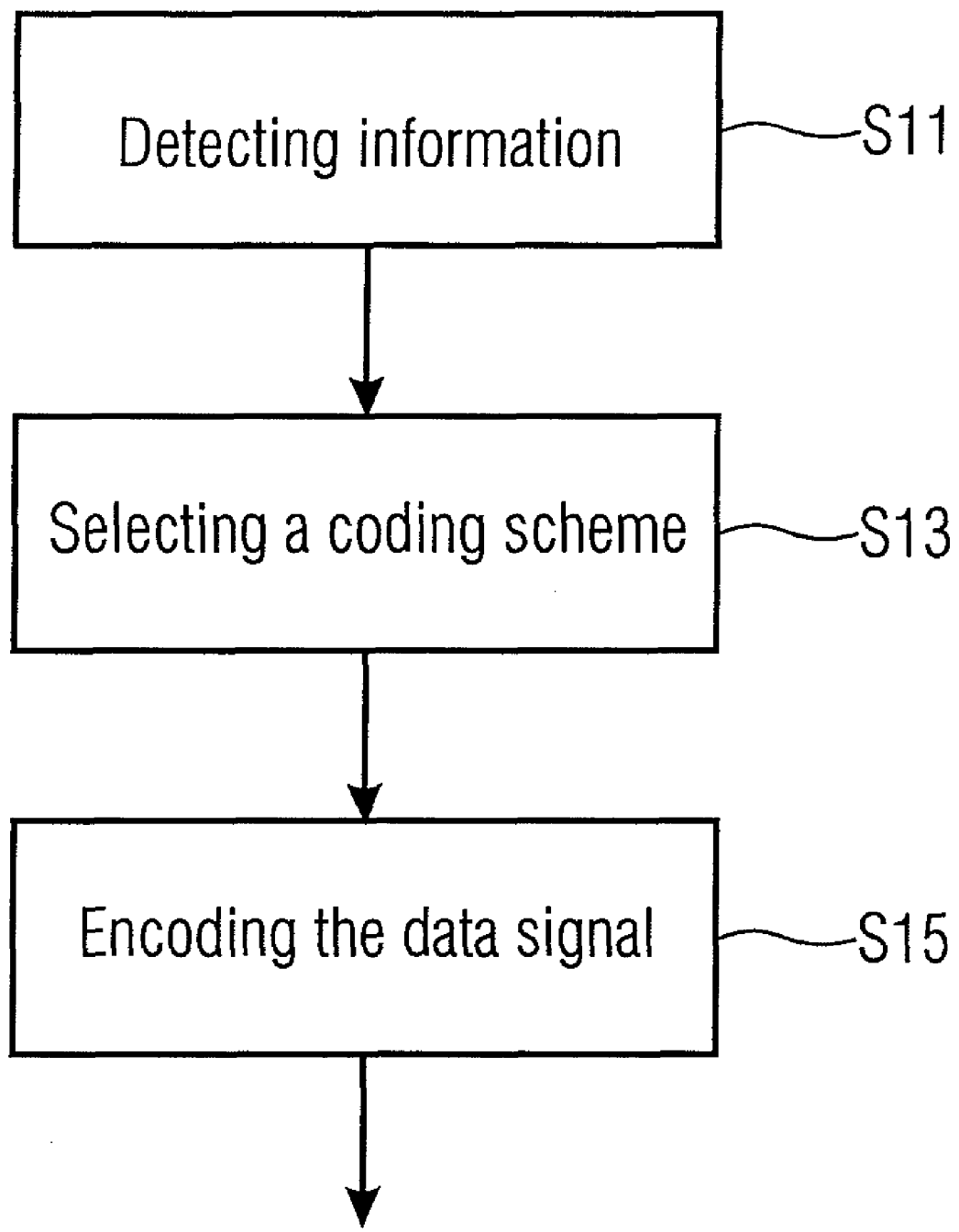
FIG. 3 shows a method for supplying an encoded data signal according to a preferred embodiment of the present invention.

The FIG. 4 embodiment is preferably combined to the FIG. 1, FIG. 2, FIG. 3 embodiments so that in addition to the FIG. 4 embodiment, the transmitter furthermore includes the controllable encoding unit 29, 53 so that an encoded data file is not only stored at the right place at the personal electronic device storage 62 but is also encoded in the right encoding format. Naturally, as in all other applications as described in this document, the encoding unit can be a full encoding unit or can be a transcoding unit transcoding a certain encoded file into another encoded file being encoded in accordance with the different encoding algorithm or, generally, encoded with a different encoded property.

Thus, in accordance with the present invention, some personal electronic devices can have different playback applications installed at the same time so that the encoding can also vary depending on which playback applications are installed or are in general possible. Thus, when content is transferred to such a personal electronic device, the present invention makes sure due to the destination information provider 60 that the content is transferred into the right folder of the storage of the personal electronic device so that the playback applications can find the content customized for the playback applications in the right place in an automatic way.

Furthermore, it is to be emphasized that the destination information can stem from the data base 27. In this embodiment, the destination information is provided in a data base entry for the intended receiver and, particularly, for the intended receiver application. Alternatively, or additionally, the destination information can be provided by the intended receiver directly without having a full data base. Again alternatively, a data base entry does not include the destination information, but includes other coding characteristics. Thus, the encoding unit 29 is controlled by unit 29 as controlled by the data base entry information while the destination information provider 60 is controlled via a direct transmission from the intended receiver.

Depending on certain implementation requirements of the inventive methods, the inventive methods can be implemented in hardware or in software. The implementation can be performed using a digital storage medium, in particular a disk, DVD or a CD having electronically readable control signals stored thereon, which cooperate with a programmable computer system such that the inventive methods are performed. Generally, the present invention is, therefore, a computer program product with a program code stored on a machine readable carrier, the program code being operative for performing the inventive methods when the computer program product runs on a computer. In other words, the inventive methods are, therefore, a computer program having a program code for performing at least one of the inventive methods when the computer program runs on a computer.

While the foregoing has been particularly shown and described with reference to particular embodiments thereof, it will be understood by those skilled in the art that various other changes in the form and details may be made without departing from the spirit and scope thereof. It is to be understood that various changes may be made in adapting to different embodiments without departing from the broader concepts disclosed herein and comprehended by the claims that follow.

The invention claimed is:

1. Apparatus for supplying an encoded data signal, comprising:
   a detector for detecting information on an intended receiver for receiving the encoded data signal;
   a data base having entries for different intended receivers, an entry having one or more properties of one or more coding schemes customized for the receiver associated with the entry;
   a selector for selecting a coding scheme to be used for encoding the data signal based on the detected information on the intended receiver detected by the detector, wherein the selector is operative to access the data base entry based on the detected information; and
   an encoder for encoding the data signal using the selected coding scheme selected by the selector.

2. Apparatus according to claim 1, in which a detector comprises:
   an interface to a portable data carrier;
   a reader for reading the portable data carrier to retrieve identification information on an intended receiver the portable data carrier is to be attached to wherein the identification information has been written by the intended receiver to the portable data carrier when the portable data carrier was inserted in the intended receiver at an earlier time, the identification information constituting the information on the intended receiver.

3. Apparatus according to claim 2, in which the reader is operative to access a predetermined area of the portable data carrier reserved for an entry of the identification information of the receiver to which the portable data carrier is to be attached.

4. Apparatus according to claim 3, in which the portable data carrier comprises a memory card, an USB/stick, a CD, a DVD or a magnetic device to store data.

5. Apparatus according to claim 2, in which an interface to the portable data carrier comprises a USB-interface, a memory card interface or a PCI-bus interface.

6. Apparatus according to claim 1, in which the entries for different intended receivers in the data base comprise an information on the device property.

7. Apparatus according to claim 1, further comprising a network interface being operative to receive information on an entry in the data base for an intended receiver and information on one or more properties customized for the intended receiver associated with the entry, the network interface being connectable to a server for the information.

8. Apparatus according to claim 1, in which the detector is operative to establish a connection with a personal electronic device and to receive an information on an identity of the personal electronic device when establishing the connection, and in which the selector is operative to access the data base and select a coding scheme with one or more properties customized to the identity of the personal electronic device.

9. Apparatus according to claim 8, in which the detector is operative to receive an identity of the personal electronic device via an I/O- interface and to transmit the encoded data signal to the personal electronic device via the I/O-interface.

10. Apparatus according to claim 9, in which the detector is operative to automatically receive an information on an identity of the personal electronic device when establishing a connection with a personal electronic device.

11. Apparatus according to claim 9, in which the detector is operative to request an information on an identity of the personal electronic device when establishing a connection with the personal electronic device.

12. Apparatus according to claim 9, in which the IO-interface is operative to establish a connection via a Bluetooth protocol.

13. Apparatus according to claim 1, in which a property of a scaling scheme is customized to a resolution of a display of the intended receiver.

14. Apparatus in accordance with claim 1,
   in which the information on the intended receiver include information on a virtual or physical storage location of the intended receiver, into which the encoded data signal is to be stored, and
   in which the apparatus further comprises a destination information provider for providing destination information on the virtual or physical storage location to an input/output interface so that the encoded data signal, when received at the intended receiver is stored at the virtual or physical storage location identified by the information on the intended receiver.

15. Apparatus according to claim 1, in which the entries for different intended receivers in the data base comprise an information on an identity of a user of the device.

16. Method for supplying an encoded data signal comprising:
   detecting information on an intended receiver for receiving the encoded data signal;
   accessing a data base having entries for different intended receivers, an entry having one or more properties of one or more coding schemes customized for a receiver associated with the entry;
   selecting a coding scheme to be used for encoding the data signal based on the information on the intended receiver; and
   encoding the data signal by using the selected coding scheme.

17. Method of claim 16, further comprising the step of accessing a data base having entries for different intended receivers, an entry having one or more properties of one or more coding schemes customized for a receiver associated with the entry.

18. Method of claim 16, further comprising the step of reading a portable data carrier to retrieve identification information on an intended receiver the portable data carrier is to be attached to wherein the identification information has been written by the intended receiver to the portable data carrier when the portable data carrier was inserted in the intended receiver at an earlier time, the identification information constituting the information on the intended receiver.

19. A system for transmitting and receiving an encoded data signal, comprising:
   a transmitter for transmitting the encoded data signal, the transmitter comprising a detector for detecting information on an intended receiver for receiving the encoded data signal;

a data base having entries for different intended receivers, an entry having one or more properties of one or more coding schemes customized for the receiver associated with the entry;

a selector for selecting a coding scheme to be used for encoding the data signal based on detected information on the intended receiver, wherein the selector is operative to access the data base entry based on the detected information; and an encoder for encoding the data signal using a selected coding scheme; and a receiver for receiving the encoded data signal and decoding the data signal.

20. Apparatus for supplying an encoded data signal, comprising:

a detector for detecting information on an intended receiver for receiving the encoded data signal;

an output interface for outputting the encoded data signal; and a destination information provider for providing, in response to the information on the intended receiver, destination information on a virtual or physical storage location of the intended receiver to the output interface so that the encoded data signal, when received at the intended receiver is stored at the virtual or physical storage location identified by the information on the intended receiver.

21. Method of supplying an encoded data signal, comprising:

detecting information on an intended receiver for receiving the encoded data signal; and providing, in response to the information on the intended receiver, destination information on a virtual or physical storage location of the intended receiver to the intended receiver so that the encoded data signal, when received at the intended receiver is stored at the virtual or physical storage location identified by the information on the intended receiver.

22. Computer program having a program code for performing, when running on a computer, a method of supplying an encoded data signal comprising:

detecting information on an intended receiver for receiving the encoded data signal;

accessing a data base having entries for different intended receivers, an entry having one or more properties of one or more coding schemes customized for a receiver associated with the entry;

selecting a coding scheme to be used for encoding the data signal based on the information on the intended receiver; and encoding the data signal by using the selected coding scheme.

23. Computer program having a program code for performing, when running on a computer, a method of supplying an encoded data signal comprising:

detecting information on an intended receiver for receiving the encoded data signal; and providing, in response to the information on the intended receiver, destination information on a virtual or physical storage location of the intended receiver to the intended receiver so that the encoded data signal, when received at the intended receiver is stored at the virtual or physical storage location identified by the information on the intended receiver.

24. Apparatus for supplying an encoded data signal, comprising:

a detector for detecting information on an intended receiver for receiving the encoded data signal, wherein the detector is operative to establish a connection with a personal electronic device via an I/O-interface and to automatically receive an information on an identity of the personal electronic device when establishing the connection via the I/O-interface;

a selector for selecting a coding scheme to be used for encoding the data signal based on detected information on the intended receiver; and an encoder for encoding the data signal using a selected coding scheme.

25. Apparatus for supplying an encoded data signal, comprising:

a detector for detecting information on an intended receiver for receiving the encoded data signal, wherein the detector is operative to establish a connection with a personal electronic device via an I/O-interface and to request an information on an identity of the personal electronic device when establishing the connection via the I/O-interface;

a selector for selecting a coding scheme to be used for encoding the data signal based on detected information on the intended receiver; and an encoder for encoding the data signal using a selected coding scheme.

* * * * *